United States Patent

McKee et al.

[15] 3,689,880
[45] Sept. 5, 1972

[54] VEHICLE BRAKE WARNING DEVICE

[72] Inventors: Robert G. McKee, 2033 Sherman Avenue, Evanston, Ill. 60201; Thomas W. Haase, 4654 North Sacramento Boulevard, Chicago, Ill. 60625

[22] Filed: Sept. 16, 1970

[21] Appl. No.: 72,653

[52] U.S. Cl. .................................340/52 A, 188/1 A
[51] Int. Cl. ...............................................B60t 17/22
[58] Field of Search....340/52 A; 188/1 A; 200/61. A

[56] References Cited

UNITED STATES PATENTS 2,217,176  10/1940  Madison...................340/52 A
2,814,684  11/1957  De Pascale..............340/52 A Primary Examiner—Alvin H. Waring
Assistant Examiner—Glen R. Swann, III
Attorney—Dawson, Tilton, Fallon & Lungmus

[57] ABSTRACT

A warning device for vehicle brakes provides a warning signal when the brake linings become excessively worn or when the linings become dangerously overheated. A conductive metal pin is inserted through the brake lining support so that one end of the pin is positioned in the brake lining. The pin is provided with a moisture-proof insulating coating which covers the one pin end and extends toward, but terminates before, the other pin end. An insulating washer is inserted over the other pin end and is snugly received about the insulating coating on the pin, and an insulated conducting wire is electrically connected to the pin adjacent to the other pin end. A hardenable insulating fluid is thereafter applied to the exposed portion of the conducting wire and the pin to insulate all exposed metal surfaces. If desired, a disc of low-melting-point metal can be positioned over the pin end before the hardenable insulating material is applied. When the brake lining is worn to the level of the insulation-coated pin, the insulation abrades and the pin eventually makes contact with the rotating braking element, either the brake drum or the brake disc, thereby completing an electrical circuit and activating a warning signal, intermittently each time the brakes are applied. If the brake linings become excessively heated, the insulation will melt and permit the pin to make contact with the lining support and activate a warning signal whether the brakes are applied or not. If the pin is equipped with the metal disc, the disc will also melt and insure electrical contact between the pin and lining support.

13 Claims, 9 Drawing Figures

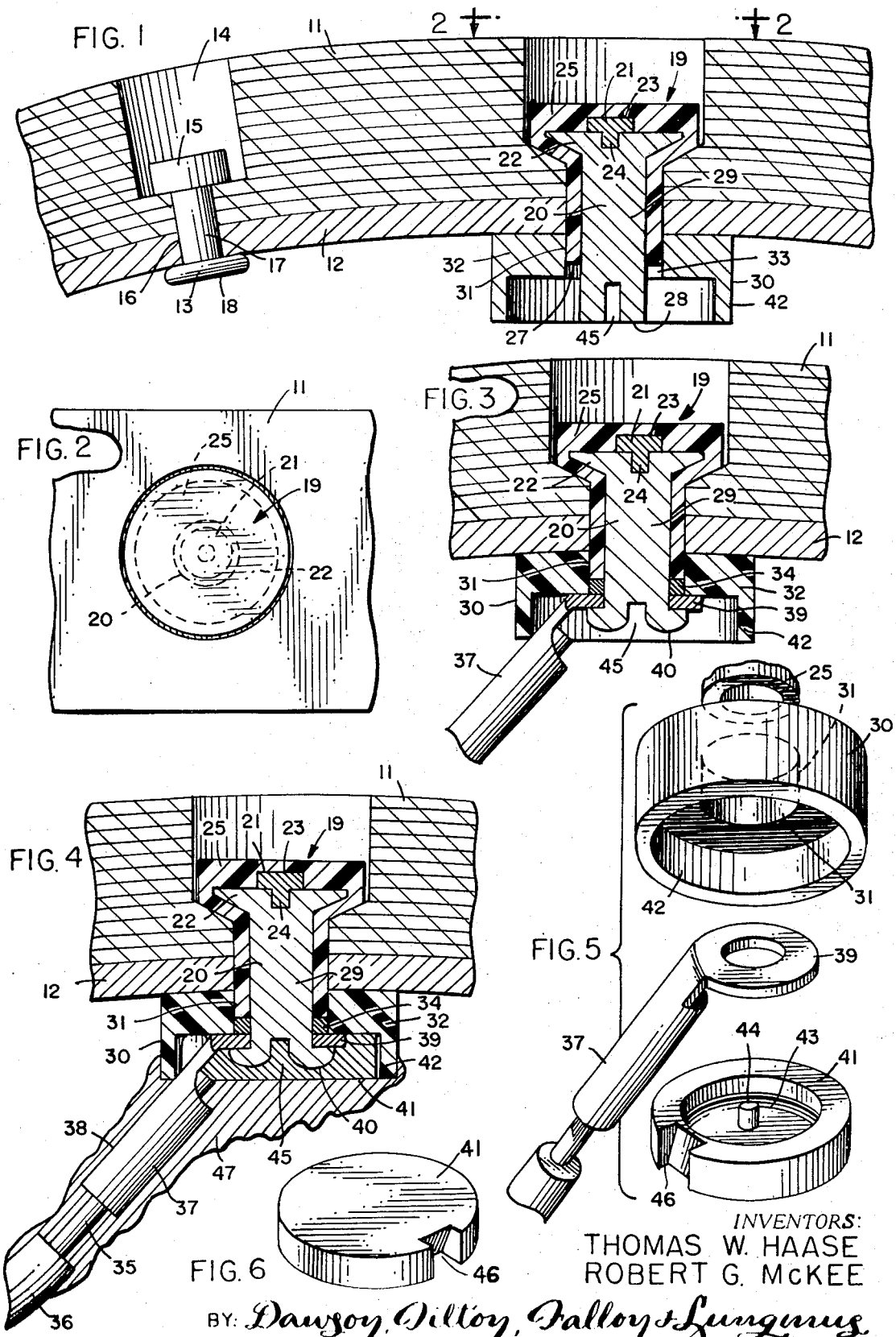

PATENTED SEP 5 1972

INVENTORS:
THOMAS W. HAASE
ROBERT G. McKEE

BY: Dawson, Tilton, Fallon & Lungmus
ATT'YS

VEHICLE BRAKE WARNING DEVICE

BACKGROUND

This invention relates to vehicle brake warning devices, and, more particularly, to a warning device which is suitable for either drum brakes or disc brakes and which provides a warning signal when the brake linings become excessively worn or excessively heated.

Brake linings are generally secured to a metal lining support by rivets or the like, and the brake lining is pressed against the rotating braking element when braking action is desired. When the lining becomes excessively worn, the rivets or other attaching means become exposed, and the rotating brake element can be scored or otherwise damaged. If the brake linings are bonded to the lining support rather than riveted, the brake linings will eventually wear to a point where the lining support will engage and damage the rotating brake element.

Warning devices for signaling the driver of a vehicle that the brake linings have become dangerously worn have been provided in the past, but these devices have not proven entirely satisfactory. Many warning devices are relatively complicated and are, therefore, expensive and difficult to install. Other devices do not insure against the transmitting of a false signal by virtue of a breakdown in the insulation between the contact element and the brake drum or other lining support. Further, most warning devices provide only a single type of signal indicating that the linings have become excessively worn and do not signal the driver that the linings are dangerously overheating. Overheating of brake linings, which can be caused by brakes which are adjusted too tight or by applying the brakes for a prolonged period of time as, for example, when descending a mountain or a long incline, can cause the brake drums to warp or even burn out the linings.

SUMMARY

Our warning device is of relatively simple construction and can be installed in place of an ordinary brake lining rivet in the openings provided in the brake linings and brake drum for the rivet. The installed warning device is completely insulated, thereby preventing false signals due to shorting out from moisture or other causes, and the insulating coating will readily wear or abrade to expose the other end of the contact or conducting pin to the brake drum. The outer end of the pin is provided with a soft, readily abradable metal which will not score or otherwise damage the brake drum and which will provide an intermittent warning signal every time the brakes are activated. The insulating coating for the conducting pin will melt at a selected temperature, thereby permitting the circuit to be completed when the brake linings become excessively heated. Further, the conducting pin can be provided with a slug or disc of solder or other relatively low-melting-point metal which will flow when the insulating coating melts, thereby insuring the completion of the warning circuit.

DESCRIPTION OF THE DRAWING

The invention will be explained in conjunction with the illustrative embodiments shown in the accompanying drawing, in which FIG. 1 is a fragmentary sectional view of a vehicle brake showing the initial steps of the installation of the inventive warning device;

FIG. 2 is an enlarged fragmentary top plan view taken along the line 2—2 of FIG. 1;

FIG. 3 is the fragmentary view of a portion of FIG. 1 showing further steps in the installation of the warning device;

FIG. 4 is a view similar to FIGS. 1 and 3 showing the final installation of the warning device;

FIG. 5 is an exploded perspective view of the insulating washer, electrical connector, and solder disc shown in FIG. 4;

FIG. 6 is a top plan view of the solder disc;

DESCRIPTION OF SPECIFIC EMBODIMENTS

Figure 7:
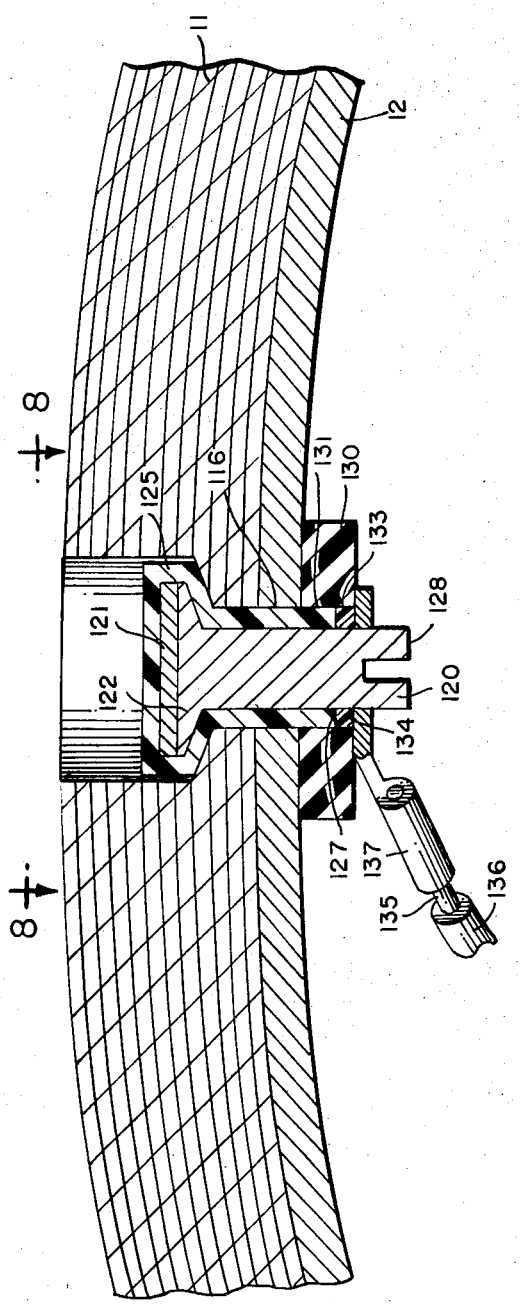
FIG. 7 is a view similar to FIG. 1 showing a different embodiment of the warning device.

Referring to FIG. 1, a conventional brake lining 11 is seen to be secured to a conventional brake shoe 12 by rivets 13 in the usual manner. The brake lining is provided with a counterbored hole 14 which receives the head end 15 of the rivet, and a narrower opening 16 is provided through the brake shoe and the remainder of the lining to receive the generally cylindrical center portion 17 of the rivet. Thereafter, the inner end 18 of the rivet is peened against the brake shoe to secure the brake lining. In conventional brakes of the drum type there may be 8 to 14 such securing rivets for each lining. It will be appreciated that when the brake lining 11 is worn down to the head end 15 of one of the rivets, the rivet will contact the brake drum each time the brakes are applied. Since the rivets are generally formed of relatively hard brass, the rivets will score and damage the brake drum, requiring replacement of the drum.

Our warning device can be installed in place of one of the ordinary attaching rivets 13. A contact element designated generally by the numeral 19 is inserted through one of the rivet openings 16 in the brake shoe. The contact element includes a generally cylindrical metal conducting pin 20 and an inlay pin 21. The conducting pin is provided with a radially enlarged head end 22, and the inlay pin includes a generally cylindrical head 23 and a tubular stem 24 which is inserted into a center opening or bore in the pin 20. A moisture-proof insulating coating 25 completely encapsulates or covers the cylindrical head of the inlay pin and the head end of the conducting pin and extends axially along the outer surface of the conducting pin through the brake shoe 12, terminating at 27 before the inner end 28 of the conducting pin. The diameter of the cylindrical central portion 29 of the pin is slightly less than the diameter of the attaching rivets so that the conducting pin and the surrounding insulating coating 25 can be inserted through a conventional rivet pole in the brake shoe. Since the head end 22 of the conducting pin and the surrounding insulating coating may be somewhat larger than the conventional counterbored openings 14 in the brake lining, this opening may be enlarged somewhat to accommodate the warning device. The brake lining material can be readily drilled, however, and enlarging the rivet opening in the lining is not difficult.

After the contact element is inserted through the opening in the brake shoe, an insulating cup-shaped washer 30 which is provided with a central opening 31 in inserted over the end of the pin protruding through the brake shoe. The central opening 31 is sized to fit relatively snugly over the insulating coating 25, and the insulating coating is seen to terminate at 27 within the thickness of the annular body portion 32 of the washer. While the insulating coating may extend throughout the entire thickness of the annular body portion of the washer, we have found it preferable to provide a small annular recess or channel 33 between the end 27 of the insulating coating and the lower surface of the annular body portion of the washer to insure that the conducting pin will be completely insulated.

After the insulating washer 30 is positioned, a moisture-proof liquid insulating material 34 (FIG. 3) is applied in the annular space 33 between the conducting pin 20 and the periphery of the central opening 31 in the washer. The insulating material can be any of a number of flowable or spreadable materials which will set to provide a moisture-proof barrier. Water-proof cement or rubber adhesive is particularly suitable for the insulating material, and we have had good results with Silastic 732 RTV Silicone Rubber Adhesive/Sealant made by Dow-Corning. This adhesive/sealant may be easily applied from a cone-shaped snip-top tube cap and will set in about 20 to 30 minutes. The insulating material is squeezed into the annular space 33, and some material may be spread out around the lower surface of the washer to insure a water-tight seal of the exposed end of the conducting pin.

Thereafter, a conducting lead wire 35 provided with an insulating covering 36 (FIG. 4) is electrically connected to the conducting pin 20 by a conventional connector 37. The connector 37 includes a clamping portion 38 which is clamped about the exposed end of the wire 35 and an eyelet portion 39 which is inserted over the lower end of the pin 20. The lower end 28 of the conducting pin is then peened as at 40 in FIG. 3 to force the eyelet 39 and washer 30 against the brake shoe and to secure the insulation-coated head end of the conducting pin against the brake lining. Thus, although the warning device is installed in place of one of the attaching rivets, the securement of the brake lining to the brake shoe is not substantially affected because the conducting pin 20 also serves as an attaching rivet.

After the peening of the lower end of the conducting pin, a slug or disc 41 (FIG. 4) of solder or other low-melting-point metal is inserted over the peened end of the conducting pin within the receptacle formed by the upstanding wall 42 of the washer. The solder disc (FIG. 5) is seen to include a central generally concave recess 43 which has the general contour of the peened end of the conducting pin and a central stud 44 which is received in a central bore 45 in the pin. A notch 46 is provided in the periphery of the disc for accommodating the downwardly extending connector 37. After the disc is positioned, additional flowable insulating material 47, which may be the same material as the insulating material 34, is applied over the solder disc and the wall 42 of the insulating washer, along the metal contact 37, and over the exposed portion of the wire 35 to completely insulate the conducting pin, connector, and wire from the brake shoe.

The wire 35 is connected to an electrical circuit including a power source, which may be the vehicle's ignition battery, and a warning signal. The warning signal may be a light mounted on the dashboard, a buzzer, or other suitable device, or a combination of such devices.

The head end 23 of the inlay pin 21 is seen to extend radially outwardly beyond the head ends 15 of the attaching rivets, and as the brake lining wears, the inlay pin will contact the brake drum (not shown) before any of the attaching rivets. Since the brake drum is electrically grounded, the circuit of the warning device will be closed whenever the inlay pin contacts the drum, thereby actuating the signal. When the driver of the vehicle sees or hears the signal, he knows that it is time to replace the brake linings.

The insulating coating 25 is formed of a material which will readily abrade as it contacts the rotating brake drum, and the inlay pin 21 will become exposed without scoring or otherwise damaging the drum. The inlay pin is also formed of relatively soft metal which will abrade on contact with the rotating drum rather than scoring the drum. Any metal which is relatively good conductor and which will wear preferentially to the brake drum can be used for the inlay pin, and we have had good results from E T P soft 99.9 percent copper. By providing the inlay pin of relatively soft metal, the conducting pin 20 can be formed of relatively harder metal, such as brass rivet brass, to provide good holding strength for securing the brake lining to the brake shoe. However, it is to be understood that if the conducting pin 20 is made of a metal soft enough to wear preferentially to the brake drum, thereby avoiding scoring of the drum, the inlay pin can be eliminated. However, some strength of securement between the lining and the shoe will be sacrificed.

Our warning device will also signal the driver when the brake linings become overheated. The material for the insulating coating is selected to withstand the heat generated by friction during normal use of the brakes but to melt at temperatures which exceed normal operating temperatures. Temperatures within automobile brakes may reach from 300° F. to 400° F. during normal operation, but sustained operation at temperatures as high as about 600° F. to about 650° F. can warp the brake drums or burn the linings. Accordingly, if the material for the insulating coating 25 is selected so that it will flow at about 550° F. to about 650° F. within a relatively short time, the conducting pin 19 will most likely make contact with the brake shoe, which is also electrically grounded, thereby completing the circuit of the warning device. After the insulating coating melts and flows away, at least two factors urge the conducting pin against the brake shoe: the jolting and vibration of the car while it is in motion, and the tension provided by the lead wire each time the brake shoe is pushed toward the brake drum.

Even if the conducting pin does not contact the brake shoe after the insulating coating melts, the solder disc 41 will insure that the warning signal is actuated. The material for the insulating washer 30 is selected so that it also will flow at about 550° F. to about 650° F. The solder disc will melt at about 430° F. and will lie molten and encased within the cup-shaped washer 30 by the insulating material 47, which is selected to withstand heat higher than the temperature at which the washer will flow. For example, Silastic 732 RTV Silicone Rubber Adhesive/Sealant is not affected by sustained temperatures of over 600° F. When the insulating washer melts and flows, the molten solder will flow to make contact between the conducting pin and the brake shoe, thereby completing the circuit. The solder disc therefore acts as a backup in case the insulating coating 25 still insulates the rivet for a time, even though it it has melted, or in case the conducting pin is not urged against the brake shoe. The disc can be formed of metal having a higher melting point than solder, but the disc should melt before the insulating coating and the washer begin to flow.

The operator will know whether the warning device has been activated by worn brake linings or by excessive heat since two different signals will be given depending upon the cause. If the warning device is actuated by worn linings, the signal will be intermittent and will occur each time the brakes are depressed. If the signal is actuated by excessive heat, it will be continuous since the contact between the conducting pin and the brake shoe will not depend upon actuation of the brakes.

The conducting pin, connector, and lead wire are completely insulated from the brake shoe by the waterproof coating 25 and water-proof insulating material 34 and 47, and the circuit will not be inadvertently shorted out by moisture or mechanical stress to give a false or premature signal.

We have found that several materials can be satisfactorily used for the insulating coating 25 on the conducting pin. Teflon FEP flourorcarbon can be insert-injection molded about the rivet and inlay pin to a thickness, for example, of about 1/32 inch. This material is readily abraded by the rotating brake drum and provides good insulation. It resists heat well up to about 400° F. to about 450° F., puddles at about 580° F., and flows at about 650° F.

Teflon FEP can be sprayed onto the conducting pin and inlay pin to a thickness, for example, of about 4 mils, and this material has the same properties as the injection-molded Teflon.

Nylon 6/6 can be insert-injection molded about the conducting pin and inlay pin, also to a thickness of about 1/32 inch. This material also is readily abraded and provides good insulation. The material will start to melt at about 480° F., but it does not flow freely until around 600° F. after about 15 minutes.

We have obtained excellent results by making the washer 30 of Nylon 6/6, although other insulating materials can be used.

The foregoing materials for the insulating coating are also hard enough to withstand the peening blows which secure the conducting pin. However, since nylon has slightly greater water absorption characteristics than other plastics, it may be desirable to dip nylon-coated conducting pins in shellac or some other water-proofing material. The pin should not be dipped any farther than the extent of the coating.

Although we have specifically described encapsulating the conducting pin with an insulating coating by injection molding or by spraying plastic, other means of providing an encapsulated insulating coating can be used. For example, the conducting pin can be dipped into an emulsion of a waterproof cement, paint, lacquer, baked enamel, rubber or latex, or other liquid coatings which will dry and insulate the pin. The important thing is to provide a water-proof insulating coating which will withstand the peening installation blows.

Figure 9:
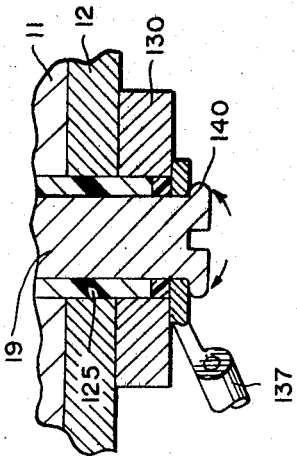
FIG. 9 is a fragmentary view of a portion of FIG. 7 showing the inner end of the conducting pin being peened in place.
Figure 8:
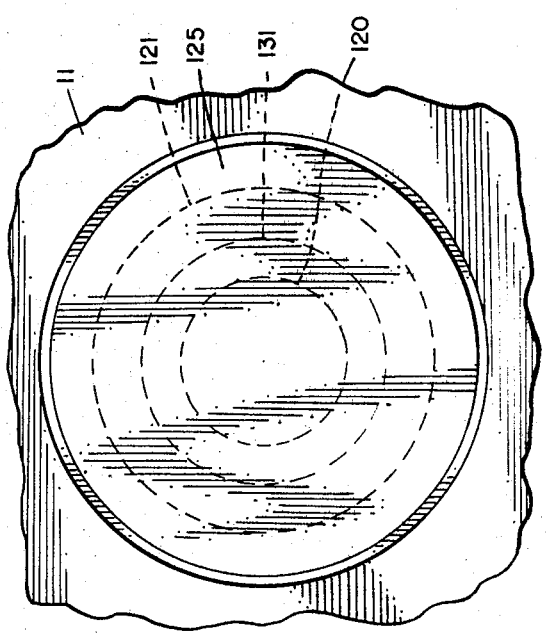
FIG. 8 is a fragmentary top plan view taken along the line 8—8 of FIG. 7.

A modified embodiment of the invention is shown in FIGS. 7–9. An elongated, generally cylindrical conducting pin 120 provided with a radially enlarged head end 122 is inserted through an opening 116 in the brake shoe 12. A layer 121 of relatively soft conducting material, such as lead, solder, graphite or the like, is positioned on the head end of the pin, and an insulating coating 124 encapsulates the head end and the cylindrical body of the pin, but terminates at 127 short of the inner end 128 of the pin. The insulating coating 125 may be of the same material as previously described with respect to the coating 25, and the thickness of both the soft layer 121 and the coating 125 may be of the order of 1/32 inch.

An insulating washer 130 having a central opening 131 sized to snugly receive the insulating coating 125 is inserted over the end of the conducting pin and positioned against the brake shoe 12. As previously described, the insulating coating on the conducting pin terminates within the central opening of the washer to provide an annular space 133 which is filled with a suitable flowable but hardenable insulating material 134, such as Silastic RTV Silicone Rubber Adhesive/Sealant.

Thereafter, a lead wire 135 having an insulated cover 136 is electrically connected to the conducting pin by means of connector 137. Referring to FIG. 9, the warning device is secured by peening the lower end 128 of the conducting pin as at 140 to secure the connector 137 and washer 130 against the brake shoe 12 and to draw the head end of the conducting pin against the brake lining. The installation is completed by applying a suitable flowable but hardenable insulating material over the exposed lower end of the conducting pin and over the electrical connector 137 and the exposed wire 135 to completely insulate the wire and conducting pin from the brake shoe.

As the lining wears to the level of the insulating coating on the head end of the conducting pin, the insulating coating will abrade to expose the soft conducting layer 121, thereby completing the electrical circuit. In either embodiment, the soft inlay pin 21 or the soft layer 121 wear only as fast as the brake lining, and the insulating coating around the sides of the inlay pin or layer 121 will hold the pin or layer in place and prevent it from being slid off the conducting pin by the rotating brake drum.

While we have described our warning device in conjunction with conventional brakes of the drum type with riveted linings, it will be understood that the device can also be used with disc brakes and with brakes which have linings which are sealed or bonded rather than riveted. Disc brakes are provided with flat friction pads or linings which are mounted on a lining support plate by means of rivets or by bonding. Our insulation-coated conducting pins can be inserted through suitable openings in the friction pad and pad support and secured as hereinbefore described with respect to the arcuate brake shoes so that the electrical circuit will be completed before the lining wears to the level of the attaching rivets or to the pad support.

While in the foregoing specification, we have set forth detailed descriptions of specific embodiment of our invention for the purpose of illustration, it is to be understood that many of the details hereingiven may be varied considerably by those skilled in the art without departing from the spirit and scope of our invention.

We claim:

1. A method of providing a vehicle brake with a warning device, the vehicle brake including a brake lining and a lining support, comprising the steps of
    inserting an insulation-coated metal conducting pin through an opening in the lining and lining support, the conducting pin having an enlarged head end positioned in the lining and preventing the pin from passing completely through the opening, the insulating coating of the conducting pin extending through the lining support but terminating before the other end of the pin,
    positioning a washer over the other pin end and against the lining support, the washer and pin being sized so that the pin extends through the washer and the insulating coating terminates within the washer to provide an annular recess between the pin and the washer,
    filling the recess with a flowable but hardenable insulating material,
    positioning an exposed portion of an insulation-covered electrical conductor about the pin adjacent the other pin end,
    peening the other pin end to secure the pin, conductor, and washer, and
    applying a flowable but hardenable insulating material over the other pin end and the exposed portion of the electrical conductor to insulate the pin and the conductor from the lining support.

2. The method of claim 1 including the step of placing a metal slug adjacent the other pin end before applying the insulating material over the pin end and conductor.

3. In combination with a vehicle brake lining and a metal lining support, a warning device comprising an electrically conducting metal pin having a pair of pin ends, an electrically insulating moisture-proof coating on the pin covering one pin end and extending toward but terminating before the other pin end, the one pin end being positioned in the brake lining and the pin extending through an opening in the lining support, an insulating washer having a central opening receiving the pin, the washer opening being sized to receive the pin and the insulating coating therearound, the insulating coating on the pin extending only partway through the washer opening to provide an annular recess between the pin and the washer, the recess being filled with the insulating material, an insulation-covered conducting wire secured to the pin adjacent the other pin end, the conducting wire adapted to be electrically connected to a warning signal, and moisture-proof insulating material covering the other pin end and extending to the insulating washer and to the insulating covering on the wire to insulate the pin and wire from the lining support.

4. The combination of claim 3 including a layer of soft electrically conducting material on the one pin end, the conducting material being covered by the insulating coating, the conducting material being softer than the conducting pin and adapted to engage a rotating brake element without scoring the braking element.

5. The combination of claim 3 in which the conducting wire is secured to the conducting pin by an electrical connector, the one pin end having an enlarged head portion positioned in the brake lining and the other pin end being peened over the electrical connector to secure the connector against the washer.

6. In combination with a vehicle brake lining and a metal lining support, a warning device comprising an electrically conducting metal pin having a pair of pin ends, an electrically insulating moisture-proof coating on the pin covering one pin end and extending toward but terminating before the other pin end, the one pin end being positioned in the brake lining and the pin extending through an opening in the lining support, an insulating washer having a central opening receiving the pin, the washer opening being sized to receive the pin and the insulating coating therearound, an insulation-covered conducting wire secured to the pin adjacent the other pin end, the conducting wire adapted to be electrically connected to a warning signal, a metal slug positioned adjacent the other pin end and the insulating washer, the slug having a melting point below 650° F., and moisture-proof insulating material covering the other pin end and the metal slug and extending to the insulating washer and to the insulating covering on the wire to insulate the pin and wire from the lining support.

7. The combination of claim 6 in which the metal slug has a melting point lower than the melting point of the insulating coating.

8. The combination of claim 6 in which the metal slug has a melting point lower than the melting points of the insulating coating and the insulating washer but greater than the melting point of the moisture-proof insulating material.

9. In combination with a vehicle brake lining and a metal lining support, a warning device comprising an electrically conducting metal pin having a pair of pins ends, an electrically insulating moisture-proof coating on the pin covering one pin end and extending toward but terminating before the other pin end, the one pin end being positioned in the brake lining and the pin extending through an opening in the lining support, an insulating washer having a central opening receiving the pin, the washer opening being sized to receive the pin and the insulating coating therearound, an insulation-covered conducting wire secured to the pin adjacent the other pin end, the conducting wire adapted to be electrically connected to a warning signal, and moisture-proof insulating material covering the other pin end and extending to the insulating washer and to the insulating covering on the wire to insulate the pin and wire from the lining support, the insulating coating on the conducting pin being flowable at a temperature below 650° F.

10. In combination with a vehicle brake lining and a metal lining support, a warning device comprising an electrically conducting metal pin having a pair of pin ends, an electrically insulating moisture-proof coating on the pin covering one pin end and extending toward but terminating before the other pin end, the one pin end being positioned in the brake lining and the pin extending through an opening in the lining support, a generally cup-shaped insulating washer having an upstanding peripheral wall and a central opening, the central opening of the washer receiving the pin and being sized to receive the pin and the insulating coating therearound, an insulation-covered conducting wire secured to the pin adjacent the other pin end, the conducting wire adapted to be electrically connected to a warning signal, a metal slug having a melting point below 650° F. positioned within the peripheral wall of the insulating washer, and moisture-proof insulating material covering the metal slug and the insulating washer and extending to the insulating covering on the wire to insulate the pin and slug and wire from the lining support, the washer and the insulating coating on the conducting pin being formed of material which will flow at a temperature below 650° F. whereby the metal slug will flow to make contact between the conducting pin and the lining support if the temperature reaches 650° F.

11. The combination of claim 10 in which the melting point of the moisture-proof insulating material is above 650° F.

12. The combination of claim 10 in which the metal slug is formed of solder.

13. The combination of claim 10 in which the metal slug is formed of solder and the washer and the insulating coating on the conducting pin are formed of material which will flow at a temperature below 600° F.

* * * * *